J. Clary.
Vegetable Cutter.
Nº 24,796.  Patented Jul. 19, 1859.
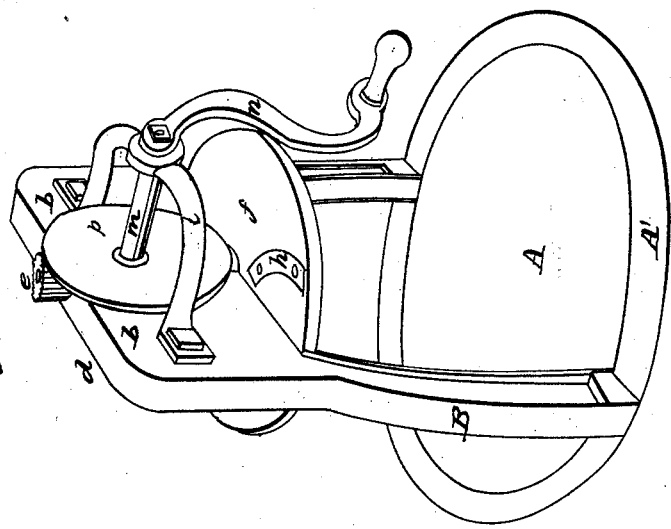
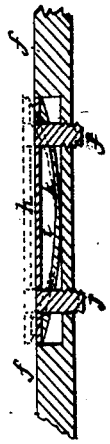
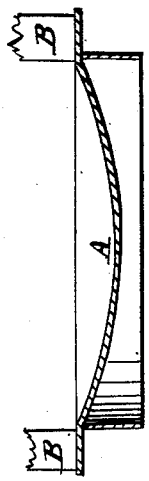
Witnesses:
H. B. Chandler
Geo. M. Young
Inventor
John Clery

UNITED STATES PATENT OFFICE.

JOHN CLARY, OF DAYTON, OHIO.

VEGETABLE-CUTTER.

Specification of Letters Patent No. 24,796, dated July 19, 1859.

*To all whom it may concern:*

Be it known that I, JOHN CLARY, of Dayton, in the county of Montgomery and State of Ohio, have invented a new and useful Improvement in Vegetable-Cutters; and I do hereby declare that the following is a full and clear description thereof, reference being had to the accompanying drawings, and to the letters of reference marked thereon, and made to form a part of this specification.

My invention relates, 1st, to the arrangement of a rotary disk with reference to the frame and a receiving pan; 2d, the use of convex curved cutting edges.

In reference to the accompanying drawings, Figure 1 is a perspective view of the cutter arranged for use. Fig. 2 is a sectional view taken through the center of the receiving pan.

(A) represents the receiving pan formed with an annular rim (A'); permanently attached to the pan (A) is a frame (B) formed with a cross plate (b), against which the vegetables may be held while being cut; passing through the cross plate (b) vertically, and also through the dish (f) is a shaft (d) provided at its upper end with a pinion wheel (e).

(f) is a rotating disk keyed to the shaft (d) and formed on its upper side with a collar, of a thickness equal to that of the thickest slices of vegetables to be cut; by means of this said shoulder the disk (f) may be arranged within the frame (B) and below the cross plate (b) in such manner as to leave the proper space between the plane of its upper surface and the lower edge of the plate (b); through the disk (f) are made curved slots, into which the cutters (h) are fitted; within a recess (i) of the disk (f) is arranged a spring (k) clearly shown in Fig. 3, in such manner as to bear against the cutters (h), by means of which the said cutters may be held firmly in their places when properly adjusted to the thickness of the slices required. (j) are screws, by means of which the cutters (h) may be secured to the disk (f) and which are made to act in concert with the springs (k) in the adjustment of the cutters. The receiving pan (A) being directly under the disk (f) is adapted to receive the cut vegetables as they fall from the bottom of the disk (f).

(l) is a bent arm bolted firmly to the plate (b). Passing through the arm (l) and having bearings in said arm and in the cross plate (b) of the frame (B) is a shaft (m), provided with a crank (n), and keyed to the shaft (m) is a pinion (p) cogs not shown in the drawing, being on the opposite side of the pinion arranged to work into the pinion (e) by medium of which the disk (f) is made to rotate.

The operation of my invention may be described as follows: The cutters (h) being first adjusted as before described to the thickness of the slices required to be cut; the vegetables will be placed against the plate (b) upon the side opposite the pinion (p), and held down against the disk (f). The crank (n) will then be operated, so, as to rotate the disk, (f) in the direction of the arrow, and as said disk is made to rotate, the vegetables will be sliced, by means of the cutters (h) as before described. The slices so cut will fall into the receiving pan (A) and may from thence be removed for use.

It is to be remarked that as the cutting faces of (h) are on the convex edge of the blade, and as the front face moves forward, in a manner so that the central part of the blade only is destitute of a draw cut, while all those parts lying between the middle and each end partake of the draw cut, if the cut were from the concave edge of the ends of the blade it would still leave the draw cut. But in this last case the draw cut is from the ends toward the center and the tendency is for the uncut mass to accumulate in the center of the blade and thus increase the resistance and so require more power to cut, than when the convex part of the blade is made the cutting edge. In this last case the draw cut diverging both ways from the center toward the ends of the blade, all that fails to be cut slides off at the ends and may be taken at the next round, and thus power is saved in the working of the machine, in my way of using the blades.

What I claim as my invention and desire to secure by Letters Patent is—

The arrangement of the shaft of the cutting disk suspended from the cross piece (b) in connection with the convex cutting edge of the cutters (h) substantially in the manner and for the purposes set forth.

JOHN CLARY.

Witnesses:
GEO M. YOUNG,
H. B. CHANDLER.